United States Patent
Benkeser et al.

[15] 3,699,143
[45] Oct. 17, 1972

[54] NOVEL PROCESS FOR THE MANUFACTURE OF HALOSILYL ORGANIC COMPOUNDS AND NOVEL PRODUCTS MADE THEREBY

[72] Inventors: Robert A. Benkeser; James M. Gaul, both of W. Lafayette, Ind.

[73] Assignee: Purdue Research Foundation, Lafayette, Ind.

[22] Filed: March 10, 1970

[21] Appl. No.: 18,332

[52] U.S. Cl....260/448.2 R, 260/46.5 R, 260/448.2 E
[51] Int. Cl...............................C07f 7/08, C07f 7/12
[58] Field of Search..................260/448.2 E, 448.2 R

[56] References Cited

UNITED STATES PATENTS 2,740,801  4/1956  MacMullen et al................. 260/448.2

OTHER PUBLICATIONS

" Chemical Abstracts" , 51, p. 4982b (1957).

Primary Examiner—Tobias E. Levow
Assistant Examiner—P. F. Shaver
Attorney—Paul A. Rose, Aldo John Cozzi, Reynold J. Finnegan, George A. Skoler and Eugene C. Trautlein

[57] ABSTRACT

Novel process for producing halosilyl organic compounds by reacting a trihalosilane having one silicon-bonded hydrogen atom per molecule with a carboxylic organic compound under anhydrous conditions in the presence of a tertiary amine. A normally liquid organic solvent which does not chemically combine with the reactants or products of the process can be used.

Novel products produced by this process are p-bromophenylmethyltrihalosilanes and dialkylphenyl-methyltrihalosilanes. The novel compounds are used to make resinous siloxanes useful as, for example, potting compositions.

21 Claims, No Drawings

NOVEL PROCESS FOR THE MANUFACTURE OF HALOSILYL ORGANIC COMPOUNDS AND NOVEL PRODUCTS MADE THEREBY

This invention relates to a novel process for producing halosilyl organic compounds and to novel halosilyl organic compounds produced thereby. More particularly, this invention relates to the production of halosilyl organic compounds, in which a halosilyl group and hydrogen are bonded to a single carbon atom of the organic moiety, by means of the reductive silylation of carboxylic organic compounds containing the carbonyloxy group,

or the carbonylamino group,

to replace the carbon to oxygen double bond and the carbon to oxygen, or nitrogen, single bond with halosilyl and hydrogen radicals. In the reductive silylation provided by this invention, at least one hydrogen to silicon bond of a trihalosilane having one silicon-bonded hydrogen per molecule is reacted with the carbon to oxygen bonds connecting the carbonyl carbon to oxygen to effect a replacement of said carbon to oxygen bonds with hydrogen to carbon and silicon to carbon bonds. The process of this invention is highly useful in the production of diverse organotrihalosilanes quickly, easily and relatively inexpensively.

We know of no previously known process which utilizes the unique reductive silylation as explained above for the conversion of carbon to oxygen double bonds and carbon to oxygen, or nitrogen, single bonds to carbon to silicon bonds and carbon to hydrogen bonds in the production of halosilyl organic compounds.

One previously known method for forming the silicon to carbon bond is the reaction of a halosilane, such as a chlorosilane, with an organometallic compound, such as a Grignard reagent. This method is very unsuitable for making halosilanes, i.e., silanes containing halogen to silicon bonds because such bonds are highly susceptible to replacement by the organometallic reagent. At best, complex and difficult-to-separate mixtures result.

Other previously known methods for forming the silicon to carbon bond are the direct synthesis reactions of alkyl halides with silicon, and high temperature condensations involving appropriate alkyl halides with trichlorosilanes. The direct synthesis reactions and high temperature condensations require complex, expensive equipment and are limited to the use of reactants and the production of products having great thermal stability.

Another previously known method for forming the silicon to carbon bond is the reaction of diazoalkanes with chlorosilanes. This method is severely limited in the types of silanes which it is capable of producing and is especially limited by the unavailability of diverse types of diazoalkanes. This method also is severely limited because of the hazardous nature of diazoalkanes.

In still another previously known method, hydrosilanes are chemically added to aliphatically unsaturated groups either thermally or catalytically. This method is economically limited to the production of alkyl silanes and vinyl silanes and is not useful for the production of diverse organohalosilanes.

This invention provides a route to the manufacture of halosilyl organic compounds having the carbon to silicon bond and is really adapted for production of such compounds on an industrial level.

The process of this invention is simple and facile to carry out and no specialized or complex, expensive equipment is required. The novel process produces high yields of the desired halosilyl organic compounds which are easily recovered from the reaction mixture using conventional separation techniques, such as, extraction, precipitation, and/or distillation. In addition, the starting materials used in this process are, for the most part, relatively inexpensive and readily available.

The process of this invention involves the reaction, under anhydrous conditions in the presence of a tertiary amine, of at least one hydrogen to silicon bond of a trihalosilane having one hydrogen atom bonded to silicon with the carbon to oxygen double bonds and carbon to oxygen or nitrogen single bonds of a carboxylic organic compound to replace same with at least one carbon to silicon bond and at least one carbon to hydrogen bond. Generally, a typical reaction of this type can be illustrated by the equation:

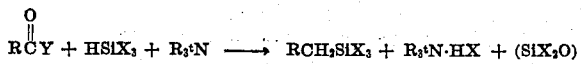

wherein the reactant

is the carboxylic compound, the reactant $HSiX_3$ is the trihalosilane, $R^t_3N$ is the tertiary amine, $RCH_2SiX_3$ is the halosilyl organic compound product, $R^t_3N \cdot HX$ is a tertiary amine hydrochloride by-product and $(SiX_2O)_x$ represents a dichlorosiloxy cyclic polymer by-product which is believed to be obtained in which x is an integer of, for example, three or four or more. R, R', X and Y are more fully defined hereinafter. If desired, a secondary amine can be also used in addition to the reactants used in equation (1) and then the typical reaction can be illustrated by the following equation:

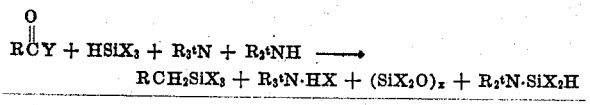

The reaction is preferably carried out in a normally liquid solvent that does not, to any substantial extent, chemically combine with the reactants or products of the reaction. Organic nitrile solvents of this type have been found to be highly effective in producing chlorosilyl organic compounds from trichlorosilane and carboxylic acids. Illustratively, organic nitrile solvents that can be used include acetonitrile, propionitrile, butyronitrile, valeronitrile, capronitrile, caprylonitrile, caprinitrile, lauronitrile, benzonitrile, tolunitrile and the like. Acetonitrile has been found to be highly useful as a solvent. Tetrahydrofuran can also be used.

The trihalosilanes employed have one hydrogen atom bonded to silicon and can be depcited by the formula:

$$HSiX_3$$

wherein X is a halogen atom, such as, chlorine, bromine or iodine. Trichlorosilane, $HSiCl_3$, is the preferred reactant.

The carboxylic compounds that can be employed as starting materials include the carboxylic acids and the anhydrides, metal salts, e.g., alkali metal salts, and amides thereof, and can be represented by the formula:

$$R\overset{O}{\underset{}{C}}Y$$

wherein R is selected from the class consisting of monovalent hydrocarbon groups; halogen-substituted monovalent hydrocarbon groups; a monovalent group of the formula, YC(O)R'—, wherein R' is a divalent hydrocarbon group or a halogen-substituted divalent hydrocarbon group, and Y is a mono-valent group selected from the class consisting of hydroxy, metal oxy, e.g., alkali metal oxy, and —NR''$_2$ wherein R'' is selected from the class consisting of hydrogen and monovalent hydrocarbon.

Preferably, R is an aryl, alkaryl, halogen-substituted aryl or a halogen -substituted alkaryl group having six to 18, more preferably six to 12, carbon atoms, and R' is arylene, alkarylene, halogen-substituted arylene or halogen-substituted alkarylene divalent groups having six to 18, more preferably six to 12, carbon atoms.

Preferably, when R'' is a monovalent hydrocarbon, it has one to 18, more preferably one to 12, carbon atoms. Preferably, R and Y are free of aliphatic carbon to carbon unsaturation. When R or R' contains a halogen substituent, such halogen is preferably chlorine, bromine or iodine.

Typical monovalent hydrocarbon groups as represented by R include phenyl, tolyl, xylyl, naphthyl, 2-, 3- and 4-ethylphenyl, biphenylyl, 2,3,4-, 2,3,5-, 2,3,6-, 2,4,5-, 2,4,6-, and 3,4,5- trimethylphenyl, 2- and 4-propylphenyl, 4-octylphenyl, p-isoamylphenyl, 2- and 4-isopropyl, 2,3-, 2,4-, 2,5-, 2,6-, 3,4-, and 3,5- dimethylphenyl and the like.

Typical monovalent hydrocarbon groups as represented by R'' include the alkyl groups, e.g., methyl, ethyl, propyl, butyl, pentyl, hexyl, octyl, nonyl, decyl, dodecyl, tetradecyl, hexadecyl, stearyl, isopropyl, isobutyl, isoamyl, neopentyl, neohexyl, neobutyl and the like; the cycloalkyl groups, e.g., cyclopentyl, cyclohexyl, and the like; the aryl, alkaryl and aralkyl groups, e.g., phenyl, tolyl, naphthyl, xylyl, benzyl, ethylphenyl, phenylethyl, biphenylyl and the like.

Typical halogen-substituted monovalent hydrocarbon groups represented by R include the haloaryl and haloalkaryl groups, e.g., o-, m-, and p-bromophenyl, 3,5-dibromophenyl, o-, m-, and p-iodophenyl, 2,3-, 2,4-, 2,5-, 2,6-, and 3,4dibromophenyl, 2,3-, 2,4-, 2,5-, 2,6-, 3,4-, and 3,5-dichlorophenyl, 3,4,5-tri-bromophenyl, 2,3,4-, 2,4,5-, and 3,4,5-trichlorophenyl, o-, m-, and p-fluorophenyl, o-, m-, p-(2-choroethyl)phenyl, o-, m-, and p-(3-chloropropyl)phenyl and the like.

Typical divalent hydrocarbon groups represented by R' include the arylene and alkarylene groups, e.g., phenylene, tolylene, xylylene, naphthylene, -C$_6$H$_4$CH$_2$C$_6$H$_4$-, 5,6-dimethyl-1,3-phenylene, 2,4-dimethyl-1,3-phenylene, anthrylene and the like.

Typical halogen-substituted divalent hydrocarbon groups represented by R' include 2-, 4-, 5- and 6-chloro-1,3-phenylene, 4-fluoro-1,3-phenylene, 2,4- and 5,6-di(chloromethyl)-1,3-phenylene, 2- and 3-(2-chloroethyl)-1,4-phenylene and the like.

Illustratively, carboxylic compounds of the type described above include the aryl and alkaryl substituted methanoic acids, e.g., benzoic acid, o-, m-, and p-phenylbenzoic acid, o-, m-, and p-toluic acid, naphthoic acid, xylic acid, phthalic acid, 3- and 4-bromophthalic acid, 3- and 4-chlorophthalic acid, 3,4-, 3,5-, 3,6- and 4,5-dichlorophthalic acid, tetrabromophthalic acid, tetrachlorophthalic acid, tetraiodophthalic acid, diphenic acid, isophthalic acid, terephthalic acid; alpha-cumidic acid, livitic acid, and the like; the halogen-substituted derivatives of the above-mentioned acids, e.g., o-, m-, and p-chlorobenzoic acid, o-, m-, and p-bromobenzoic acid, o-, m-, and p-iodo-benzoic acid, o-, m-, and p-fluorobenzoic acid, 2,3-, 2,4-, 2,5- 2,6-, and 3,4-dibromobenzoic acid, 2,3-, 2,4-, 2,5- 2,6-, 3,4-, and 3,5-dichlorobenzoic acid, 3,4,5-tribromobenzoic acid, 2,3,4-, 2,4,5-, and 3,4,5-trichlorobenzoic acid and the like; the metal salts, including alkali metal salts, e.g., sodium, potassium and the like of each of the above-listed acids; the full amides of each of the above-listed acids, e.g., the N,N-dimethyl, N,N-diethyl, N,N-dihexyl, N,N-didecyl, N,N-distearyl, N,N-ethylmethyl, N,N-dipropyl, N,N-dibutyl, N,N-diphenyl, N-methyl (-NHCH$_3$), N-ethyl (-NHC$_2$H$_5$), N-propyl (-NHC$_3$H$_7$), N-stearyl (-NHC$_{18}$H$_{37}$), N-butyl (-NHC$_4$H$_9$), and N-phenyl (-NHC$_6$H$_5$) amides of each of the above-listed acids; and the half amides of the above-listed dicarboxylic acids; and the anhydrides of each of the above-listed acids.

The tertiary amine, R'$_3$N, employed in the process of this invention preferably is a trialkylamine, such as, tri-n-propylamine, tri-n-hexylamine, triethylamine, tributylamine, trihexylamine and the like. Any tertiary amine that does not, to any substantial extent, chemically combine with the carboxylic compound or the reaction products but combines with the hydrogen halide released during the reaction to form the tertiary amine hydrohalide may be used, such as, pyridine, picoline, collidine, quinoline, and the like. It is convenient to select a tertiary amine which is soluble in the media in which the reaction takes place and the hydrochloride of which is insoluble in such media or precipitates when an extracting solvent, such as ether, is added during recovery operations after completion of the reaction.

The secondary amine, R'$_2$NH, if used, is preferably a dialkylamine, such as, di-n-propylamine, di-n-butylamine, diethylamine, di-n-hexylamine, and the like. Any secondary amine that does not, to any substantial extent, chemically combine with the carboxylic compound or the reaction products or chemically compete with the reactions shown in equations (1) or (2) but combines with the hydrogen dihalosilyl group as shown in these equations may be used.

In general, the reaction illustrated by the above equation can be conducted by mixing the trihalosilane, carboxylic compound, and tertiary amine (with or without the secondary amine), preferably in a solvent such as acetonitrile, and maintaining the mixture at an elevated temperature, e.g., about 40° C. to about 200° C., preferably about 50° C. to about 100° C. The reaction temperature is not narrowly critical and can be varied widely. The reaction is conveniently carried out by refluxing the mixture until the desired halosilane is formed. Refluxing can be conveniently conducted at atmospheric pressure, although higher or lower pressures can be employed. The reaction time also is not narrowly critical and can be varied over broad ranges. For example, times of as little as about one-half hour or less up to about 24 hours or more may be used. If desired, the reaction mixture can be stirred at room temperature (e.g., 25° to 30° C.) for a period of time ranging from one-half hour or less to 2 hours or more before refluxing or otherwise raising the temperature to an elevated level.

The relative amounts of carboxylic compound, trihalosilane and tertiary amine mixed to form the reaction mixture are not narrowly critical. Preferably, stoichiometric amounts up to a large excess of trihalosilane and tertiary amine can be employed. Thus, for each mole of carboxylic compound, preferably at least about 3 moles of trihalosilane are used in forming the reaction mixture. Although in the usual case only 1 mole of trihalosilane chemically combines with 1 mole of the carbonyl halide, an additional 2 moles of trihalosilane is believed to be consumed in the reaction as shown in the above equations. Greater amounts of trihalosilane, for example, up to 8 or 10 moles, per mole of carboxylic compound, can be used to form the reaction mixture, although about 3 to about 6 moles per mole of carboxylic compound are preferred. Lower amounts of trihalosilane may be employed although lower yields and longer reaction time may result.

The number of moles of tertiary amine per mole of carboxylic compound also is not narrowly critical and can range from about 2 to about 8, preferably about 2 to about 4, moles of tertiary amine per mole of carboxylic compound.

The amount of secondary amine, if used, is not narrowly critical and can range from about one-half mole to four moles, preferably 1 to 2 moles, per mole of carboxylic compound.

The order in which the reactants are mixed is not narrowly critical, although it is usually preferred, because of the exothermic nature of the reaction, to control the reaction by the slow addition of the tertiary amine to a mixture of the trichlorosilane and carboxylic compound. It is also usually desirable to chill the reaction mixture during such addition as an aid to controlling the exothermic reaction. For this purpose, also, it is usually preferred to conduct the reaction in a suitable solvent as explained above. The amount of solvent is not narrowly critical and can vary over a wide range. Too small amounts of solvent could, of course, be of little effect in controlling the reaction and too much could, of course, render the reaction too sluggish. It is convenient to employ the solvent in amounts ranging from about 10 parts to about 500 parts, preferably about 50 parts to about 100 parts, by weight of solvent per 100 weight parts of trihalosilane, carboxylic compound and tertiary amine in the reaction mixture.

The product halosilyl organic compound can be recovered by any convenient means, such as by fractional distillation under reduced pressure or, especially if the product has a high boiling point, by rotary evaporation under reduced pressure. It is preferable to remove the tertiary amine hydrochloride by-product prior to recovering the halosilyl product and this can be conveniently accomplished by adding a precipitant for the tertiary amine hydrochloride, such as ether or pentane, which dissolves the halosilyl product and the remaining by-products.

The novel halosilyl organic compounds of this invention are the bromophenylmethyltrihalosilanes, e.g., p-bromobenzyltrichlorosilane, and the dialkylphenylmethyltrihalosilanes, e.g., 3,5-dimethylbenzyltrichlorosilane.

The halosilyl organic compounds of this invention are useful in a wide variety of applications. By hydrolysis and condensation in accordance with well known techniques of hydrolyzing and condensing known halosilyl organic compounds, the halosilyl organic compounds disclosed herein form resinous siloxanes that are useful, for example, as protective coatings, molding compositions and potting compositions for electronic components. The halosilyl organic compounds disclosed herein can be cohydrolyzed and cocondensed with other halosilyl organic compounds to vary the properties desired in the resulting resinous siloxane to suit particular requirements for protective coatings and potting compositions made from such siloxanes. Also, the halosilyl organic compounds can be further reduced with potassium hydroxide and ethanol to cleave the halosilyl groups and replace them with hydrogen thus forming the corresponding organic compound, for example, in a manner which might be explained by the equation:

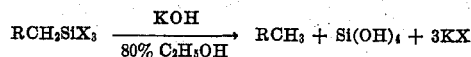

The corresponding organic compounds are well known and have applications that are well known to those skilled in the art.

The following examples are presented in which, unless otherwise specified, all parts and percentages are on a weight basis and all temperatures are on the centigrade scale.

EXAMPLE 1

Preparation of p-bromobenzyltrichlorosilane from p-bromobenzoic acid

A dry 300 ml three-necked flask fitted with a reflux condenser, addition funnel, pot thermometer and a magnetic stirring bar was charged with 20.0 g (0.10 mole) p-bromobenzoic acid, 10.0 g (0.10 mole) di-n-propylamine, $Pr_2NH$, and 75 ml of anhydrous $CH_3CN$. A slight positive nitrogen pressure was maintained in the system. The mixture was warmed until all the p-bromobenzoic acid was taken into the liquid phase. Then 62.5 g (0.50 mole) trichlorosilane was added and the resulting mixture heated at reflux for 1 hour. Then 57.2 g (0.4 mole) of tri-n-propylamine, $Pr_3N$, was added dropwise to the mixture cooled by means of an ice bath to keep the pot temperature below 25° C. After complete addition, the mixture was then heated by an electric heating mantle, to refluxing temperature, 77°–85, for 18 hours.

The mixture was cooled and treated with 500 ml of anhydrous ether, precipitating a large amount of a crystalline solid. The suspension was filtered under anhydrous conditions; the solid obtained was washed twice with 100 ml portions of anhydrous ether and then dried in vacuo. The solid amounted to 70.1 g (97.5 percent yield) and was identified as tri-n-propylamine hydrochloride, $Pr_3N\cdot HCL$, m.p. 135°–137°.

The combined etherate solutions were distilled through a 200 mm Vigreux column. After removal of ether and excess trichlorosilane at atmospheric pressure, a pale-yellow liquid was collected (16.7 g., 90°–92° at 0.1 mm Hg reduced pressure). A vapor phase chromatographic check showed only one component which was analyzed and shown to be p-bromobenzyltrichlorosilane. The elemental analysis conducted on the product showed:

Anal. calcd. for $C_7H_6SiCl_3Br$

%C, 27.62; H, 1.99; Si, 9.22; Cl, 34.93; Br, 26.24.
Found:
%C, 27.81; H, 2.20; Si, 9.40; Cl, 34.98; Br, 26.23.

Nuclear magnetic resonance and infra red spectra verified the product as p-bromobenzyltrichlorosilane.

The reaction involved in this process may be depicted as:

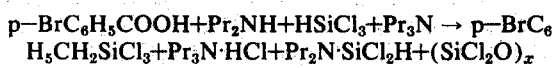

p—$BrC_6H_5COOH+Pr_2NH+HSiCl_3+Pr_3N \rightarrow$ p—$BrC_6H_5CH_2SiCl_3+Pr_3N\cdot HCl+Pr_2N\cdot SiCl_2H+(SiCl_2O)_x$

EXAMPLES 2 THROUGH 6

The general procedure of Example 1 was carried out five more times without, however, any di-n-propylamine. In each case, the carboxylic compound used is designated in Table I below and the molar ratio of carboxylic compound to trichlorosilane to tri-n-propylamine used was 1:5:2. Anhydrous acetonitrile in the amount of 800 ml per gram-mole of carboxylic compound was added to each reaction mixture. Also, in each case the mixture resulting after addition of all the tri-n-propylamine was refluxed for the times at the temperatures correspondingly listed in Table I. Treatment of the resulting reaction mixture in each case with dry ether caused the precipitation of tri-n-propylamine hydrochloride in yields ranging from 86 percent to 98 percent. The products listed in Table I were separated by distillation of the resulting filtrate at the temperatures and reduced pressures correspondingly listed. The yields of each product are also listed. The identities of the products of Examples 2, 3 and 5 were confirmed by infra red and nuclear magnetic resonance spectra. The identities of the products of Examples 4 and 6 were verified by elemental analysis and infra red and nuclear magnetic resonance. In each case, the residue after distillation had infra red spectra dominated by Si—O absorption, suggesting the dichlorosiloxane cyclic polymer $(SiCl_2O)_x$.

EXAMPLE 7

The process of Example 3 was repeated except that tri-n-butylamine was substituted on a mole for mole basis for tri-n-propylamine and there resulted a 65 percent yield of p-chlorobenzyltrichlorosilane.

What is claimed is:

1. Process for producing halosilyl organic compounds comprising reacting, under anhydrous conditions in the presence of a tertiary amine, a trihalosilane having one silicon-bonded hydrogen per molecule with a carboxylic compound having the formula

$$R\overset{O}{\underset{\|}{C}}Y$$

wherein R is selected from the class consisting of aryl, alkaryl, halogen-substituted aryl and halogen-substituted alkaryl groups having 6 to 18 carbon atoms, Y is a monovalent group selected from the group consisting of hydroxy and $-NR''_2$ wherein $R''$ is selected from the group consisting of hydrogen and monovalent hydrocarbon.

2. Process as claimed in claim 1 for producing chlorosilyl organic compounds wherein said trihalosilane is trichlorosilane, and Y is hydroxyl.

3. Process as claimed in claim 2 wherein said reaction is carried out in a normally liquid organic solvent which does not substantially chemically combine with the reactants or products of said process.

4. Process as claimed in claim 3 wherein said solvent is an alkane nitrile.

5. Process as claimed in claim 3 wherein said solvent is tetrahydrofuran.

6. Process as claimed in claim 4 wherein said solvent is acetonitrile.

7. Process as claimed in claim 3 wherein said tertiary amine is a trialkylamine.

8. Process as claimed in claim 7 wherein said tertiary amine is tripropylamine.

9. Process as claimed in claim 7 wherein said tertiary amine is tributylamine.

10. Process as claimed in claim 3 wherein said carboxylic compound is an aryl carboxylic acid.

11. Process as claimed in claim 3 wherein said carboxylic compound is a halogen-substituted aryl carboxylic acid.

12. Process as claimed in claim 11 for producing benzyltrichlorosilane wherein said carboxylic compound is benzoic acid.

13. Process as claimed in claim 11 for producing p-bromobenzyltrichlorosilane wherein said carboxylic acid compound is p-bromobenzoic acid.

TABLE I

| Example | Carboxylic reactant | Product | Reaction conditions | | Product distillation conditions | | Yield, percent |
|---|---|---|---|---|---|---|---|
| | | | Temp., °C. | Time, hrs. | Mm. Hg | °C. | |
| 2 | Benzoic acid, $C_6H_5COOH$ | Benzyltrichlorosilane, $C_6H_5CH_2SiCl_3$ | 77–82 | 14 | 8 | 82–84 | 58 |
| 3 | p-Chlorobenzoic acid, p-$ClC_6H_4COOH$ | p-Chlorobenzyltrichlorosilane, p-$ClC_6H_4CH_2SiCl_3$ | 73–77 | 16 | 2 | 88–90 | 69 |
| 4 | p-Bromobenzoic acid, p-$BrC_6H_4COOH$ | p-Bromobenzyltrichlorosilane, p-$BrC_6H_4CH_2SiCl_3$ | 72–79 | 15 | 0.1 | 90–92 | 58 |
| 5 | p-Methylbenzoic acid, p-$CH_3C_6H_4COOH$ | p-Methylbenzyltrichlorosilane, p-$CH_3C_6H_4CH_2SiCl_3$ | 71–77 | 16 | 8 | 92–94 | 56 |
| 6 | 3,5-dimethylbenzoic acid, 3,5-$(CH_3)_2C_6H_4COOH$ | 3,5-dimethylbenzyltrichlorosilane, 3,5-$(CH_3)_2C_6H_4CH_2SiCl_3$ | 75–82 | 18 | 2 | 84–86 | 51 |

14. Process as claimed in claim 11 for producing p-chlorobenzyltrichlorosilane wherein said carboxylic compound is p-chlorobenzoic acid.

15. Process as claimed in claim 11 for producing p-methylbenzyltrichlorosilane wherein said carboxylic acid compound is p-methylbenzoic acid.

16. Process as claimed in claim 11 for producing 3,5-dimethylbenzyltrichlorosilane wherein said carboxylic compound is 3,5-dimethylbenzoic acid.

17. Process as claimed in claim 2 wherein said trichlorosilane, said carbonyl halide and said tertiary amine are mixed in a ratio of at least 3 moles of said trichlorosilane and at least 1 mole of said tertiary amine per mole of said carboxylic compound and the reaction is carried out at elevated temperatures.

18. A process as claimed in claim 1 wherein the reaction is conducted in the presence of a secondary amine.

19. A process as claimed in claim 18 wherein the secondary amine has the formula $$R_2'NH$$

wherein R' is an alkyl group.

20. A process as claimed in claim 1 for producing halosilyl organic compounds comprising reacting, under anhydrous conditions in the presence of a tertiary amine, (a) a wherein X is a halogen atom with (b) a carboxylic compound having the formula:

$$\overset{O}{\underset{\|}{RCY}}$$

wherein R is an aryl or alkaryl group having from six to 18 carbon atoms and Y is a hydroxy group to effect replacement of the carbon to oxygen bonds of the carbonyl group and the carbon to Y bond of the carboxylic compound by one carbon to silicon bond and two carbon to hydrogen bonds, the silicon atom in said carbon to silicon bond being present in a $-SiX_3$ group wherein X is a halogen atom.

21. A process as claimed in claim 1 for producing halosilyl organic compounds comprising reacting, under anhydrous conditions in the presence of a tertiary amine, (a) a trihalosilane having the formula:

$$HSiX_3$$

wherein X is a halogen atom with (b) a carboxylic compound having the formula:

$$\overset{O}{\underset{\|}{RCY}}$$

wherein R is an aryl or alkaryl group having from six to 18 carbon atoms and Y is a $-NR_2''$ group (wherein R'' is selected from the class consisting of hydrogen and an aryl or alkaryl group having from six to 18 carbon atoms to effect replacement of the carbon to oxygen bonds of the carbonyl group and the carbon to Y bond of the carboxylic compound by one carbon to silicon bond and two carbon to hydrogen bonds, the silicon atom in said carbon to silicon bond being present in a $-SiX_3$ group wherein X is a halogen atom.

* * * * *

UNITED STATES PATENT OFFICE
CERTIFICATE OF CORRECTION

Patent No. 3,699,143          Dated October 17, 1972

Inventor(s) R. A. Benkeser & J. M. Gaul

It is certified that error appears in the above-identified patent and that said Letters Patent are hereby corrected as shown below:

Column 9, line 27, after "(a) a" insert --trihalosilane having the formula: $HSiX_3$ --

Signed and sealed this 22nd day of January 1974.

(SEAL)
Attest:

EDWARD M. FLETCHER, JR.　　　　　RENE D. TEGTMEYER
Attesting Officer　　　　　　　　Acting Commissioner of Patents